US008248601B2

(12) United States Patent
Corbeil et al.

(10) Patent No.: US 8,248,601 B2
(45) Date of Patent: Aug. 21, 2012

(54) OPTICAL MASK FOR DETECTOR OPTIMIZATION

(75) Inventors: James L. Corbeil, Knoxville, TN (US); Nan Zhang, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 325 days.

(21) Appl. No.: 12/559,294

(22) Filed: Sep. 14, 2009

(65) Prior Publication Data

US 2010/0067001 A1 Mar. 18, 2010

Related U.S. Application Data

(60) Provisional application No. 61/096,331, filed on Sep. 12, 2008.

(51) Int. Cl.
*G01J 3/04* (2006.01)

(52) U.S. Cl. ......................................... 356/310

(58) Field of Classification Search ................ 356/73, 356/310, 399–401
See application file for complete search history.

(56) References Cited

U.S. PATENT DOCUMENTS

| 4,305,661 | A | | 12/1981 | Pryor et al. |
| 4,720,426 | A | | 1/1988 | Englert et al. |
| 5,440,129 | A | * | 8/1995 | Schmidt .................. 250/366 |
| 6,847,701 | B2 | * | 1/2005 | Hoheisel et al. ............. 378/154 |
| 7,164,136 | B2 | * | 1/2007 | Aykac et al. ............. 250/370.11 |
| 7,180,588 | B2 | | 2/2007 | Geshwind et al. |
| 7,233,640 | B2 | | 6/2007 | Ikhlef et al. |
| 7,248,358 | B2 | | 7/2007 | Geshwind et al. |

OTHER PUBLICATIONS

Deiters et al. "Properties of the avalanche photodiodes for the CMS electromagnetic calorimeter." 2000, Nuclear Instruments and Methods in Physics Reasearch. 453, pp. 223-226.*

* cited by examiner

*Primary Examiner* — Tara S Pajoohi Gomez
(74) *Attorney, Agent, or Firm* — Peter Kendall

(57) ABSTRACT

An optical mask positioned on a scintillator array. The optical mask includes a reflective layer. One or more windows can be positioned on the surface of optical mask.

17 Claims, 2 Drawing Sheets

OPTICAL MASK FOR DETECTOR OPTIMIZATION

CROSS-REFERENCES TO RELATED APPLICATIONS

This application claims benefit under 35 U.S.C. §119(e) to U.S. Provisional Patent Application Ser. No. 61/096,331 filed on Sep. 12, 2008, which is hereby incorporated by reference in its entirety.

FIELD

The following relates to an optical mask, and more particularly to an optical mask for use in a medical radiation imaging scanner.

BACKGROUND

Medical radiation imaging scanners, for example (but not limitation), a computed tomography (CT) imaging scanner, a positron emission tomography (PET) imaging scanner, or a single photon emission computed tomography (SPECT) imaging scanner, can employ a high frequency electromagnetic energy source, for example (but not limitation), a neutron, electron, proton, X-ray, or gamma ray source, which emits a high-energy beam or particle toward a subject. PET and SPECT often employ a gamma-emitting tracer as a high-energy source. CT often employs a radiation source, such as an X-ray tube.

The high-energy beam, particle, or emission can impinge on one or more detectors. Often the beam, particle or emission impinges on a detector after being attenuated by a subject. Each detector can produce one or more electrical signals, based on the high-energy beam, particle, or emission received by the detector. The electrical signals can be processed to produce a useful image of the subject. The detectors, and in some cases the high frequency electromagnetic energy source, can be rotated around the subject to produce three-dimensional images of the subject.

The high-energy beam, particle, or emission received at the detector can be collimated with a collimator, so that only rays traveling parallel to a specified direction are allowed through. Collimators are used, because it is not yet possible to focus radiation with such short wavelengths into an image through the use of lenses as is routine with electromagnetic radiation at optical or near-optical wavelengths. The collimated beam can be directed to a scintillator. A scintillator is a material, which exhibits the property of luminescence when excited by ionizing radiation. Luminescent materials, when struck by an incoming particle, absorb its energy and scintillate, i.e. reemit the absorbed energy in the form of light. The light energy produced by the scintillator can be used to produce one or more electrical signals by an electronic light sensor such as a photomultiplier tube (PMT) or a photodiode. The electrical signals can be processed to produce a useful image of the subject.

State-of-the-art detector designs currently incorporate a reflective "seat" element that aids in the gathering of incoming photons as well as to mechanically position the photo sensor array. This "seat" can be constructed in numerous ways, including potting and injection molding. However, the primary characteristic driving the material choice for the "seat" is the reflectivity of the material. Materials with poor reflective characteristics negatively affect both the overall magnitude of the generated signal as well as the positioning of scintillation events—both critical to radiation detection. In general, mechanical properties such as thermal conductivity and strength are secondary considerations. As the detectors become more hybridized, new designs must make due with fewer structural elements; encompassing greater functionality, in order to fulfill spatial constraints. In addition, often the performance of new silicon based sensors is dependent upon the ability to control the surrounding temperature.

A need exists, therefore, for a medical imaging detector having a reflective optical mask layer independent of the "seat" structure. Such a geometry would allow for the optimization of the "seat" for both improved thermal conduction and/or improved mechanical properties, without sacrificing optical performance. It would be desirable to transfer the reflective optical mask away from the "seat."

SUMMARY

One embodiment provides an optical mask for a scintillator array in a medical imaging device, the optical mask can include a light guide layer and a reflective layer affixed to a surface of the light guide layer, wherein the light guide layer comprises a rigid structural material. The reflective layer can have greater than or equal to 90% reflectivity for wavelengths between 300 and 800 nm. The reflective layer can have greater than or equal to 95% reflectivity. The reflective layer can have greater than or equal to 98% reflectivity between 400 and 700 nm. The reflective layer can include diffracting particles. The optical mask can include one or more windows extending through both the light guide layer and the reflective layer. The optical mask can be disposed around an avalanche photodiode (APD) having an active area of 5.6×5.6 mm, in which case the size and shape of the one or more windows can be optimized, such that at least one of the one or more windows is rectangular in shape and has dimensions of 7.2×7.2 mm. The optical mask can be disposed around an avalanche photodiode (APD) having an active area of 5.6×5.6 mm, in which case the size and shape of the one or more windows can be optimized, such that at least one of the one or more windows is circular in shape and has a diameter of 8.4 mm diameter.

Another embodiment provides an optical mask for a scintillator array in a medical imaging device. The optical mask can be produced by affixing a reflective layer to a surface of the light guide layer. The light guide can include a rigid structural material. The reflective layer can be painted onto the light guide. The reflective layer can be affixed to the light guide using a pressure sensitive adhesive.

Another embodiment provides a method for producing an optical mask for a scintillator array in a medical imaging device. The method can include affixing a reflective layer to a surface of the light guide layer. The light guide can include a rigid structural material. The reflective layer can be painted onto the light guide. The reflective layer can be affixed to the light guide using a pressure sensitive adhesive.

Many other aspects and examples will become apparent from the following disclosure.

BRIEF DESCRIPTION OF THE DRAWINGS

The following figure is provided to explain various aspects, examples, and inventive embodiments.

Figure 1:
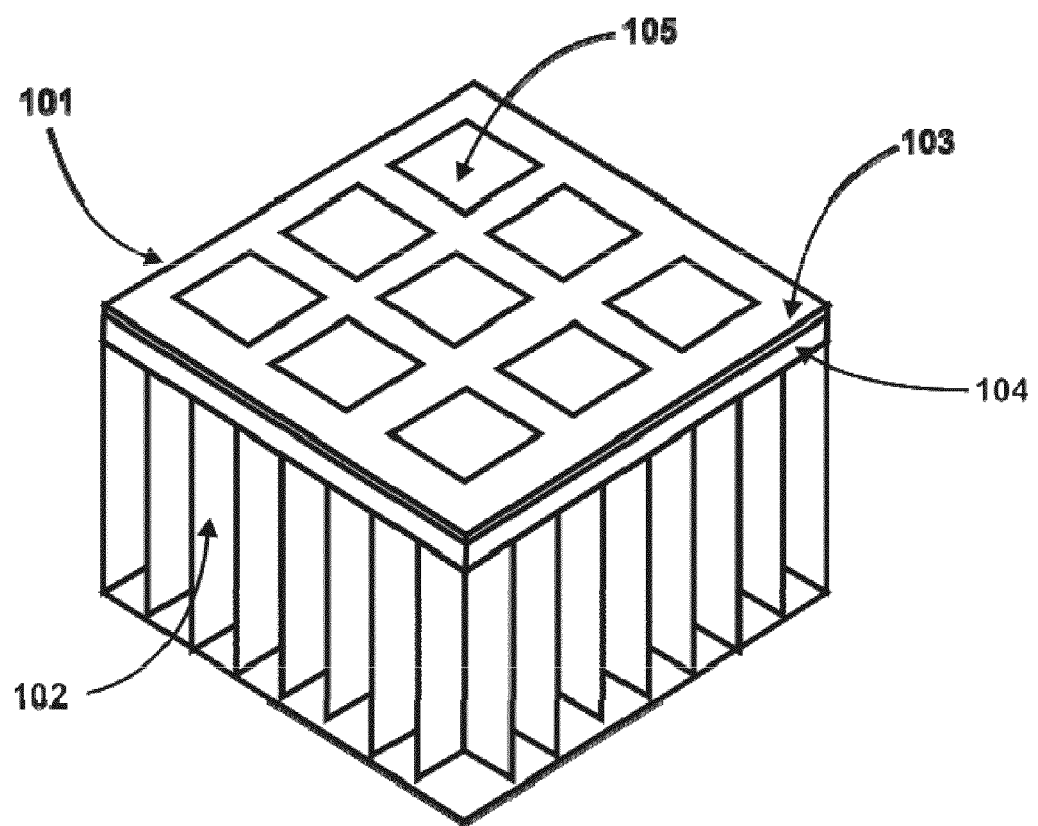
FIG. 1 depicts a schematic representation of an optical mask applied to an LSO scintillator array.

It should be understood that the various embodiments are not limited to the arrangements and instrumentality shown in the drawing.

DETAILED DESCRIPTION

The functions described as being performed by various components can be performed by other components, and the various components can be combined and/or separated. Other modifications can also be made.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Thus, the following disclosure describes an optical mask for detector light gathering optimization, more specifically event positioning and overall signal magnitude. Many other examples and other characteristics will become apparent from the following description.

Referring to FIG. 1, an optical mask 101, is shown. The optical mask can be positioned on a scintillator array 102, which can be, for example (but not limitation) a scintillator array. Optical mask 101 can include a reflective layer 103 and a light guide 104. One or more windows 105 can be positioned on the surface of optical mask 101.

The optical mask 101 can be disposed around a photo sensor. Since the optical mask includes a reflective layer 103 and a light guide 104, disposing the optical mask around the photo sensor can provide support for an array of sensors. The light guide can be a rigid material, capable of providing structural support. The reflective layer 103 need not bear a significant structural load.

The scintillator array 102 can include one or more types of scintillators. Scintillators can be selected from the group consisting of organic crystals, organic liquids, plastics, inorganic crystals, gaseous scintillators, glasses, and combinations thereof. Suitable organic crystals can be aromatic hydrocarbon compounds containing linked or condensed benzene ring structures. Organic crystals can include, but are not limited to, anthracene, stilbene, naphthalene. Suitable organic liquids can be liquid solutions of one or more organic scintillators in an organic solvent. Solutes can include, but are not limited to, fluors such as p-Terphenyl, 2-(4-Biphenylyl)-5-phenyl-1,3,4-oxadiazole (PBD), butyl PBD, 2,5-Diphenyloxazole (PPO), and/or wavelength shifters, such as 4-bis(5-phenyloxazol-2-yl)benzene (POPOP). Solvents can include, but are not limited to, toluene, xylene, benzene, phenylcyclohexane, triethylbenzene, and/or decalin. Plastic scintillators can be solutions of organic scintillators in a solvent, which is subsequently polymerized to form a solid. Solutes can include, but are not limited to, p-Terphenyl, PBD, butyl PBD, PBO, POPOP. Plastic solvents can include, but are not limited to, polyvinyltoluene and polystyrene. Inorganic scintillators can be crystals grown in high temperature furnaces, for example (but not limitation), alkali metal halides, often with a small amount of activator impurity. Inorganic alkali halide crystals can include, but are not limited to, NaI(Tl) (sodium iodide doped with thallium), CsI(Tl), CsI(Na), CsI(pure), CsF, KI(Tl), and LiI(Eu). Non-alkali crystals can include, but are not limited to $BaF_2$, $CaF_2(Eu)$, ZnS(Ag), $CaWO_4$, $CdWO_4$, $Y_3Al_5O_{12}(Ce)$, gadolinium oxyorthosilicate (GSO), lutetium oxyorthosilicate (LSO). Inorganic scintillators can also include, but are not limited to, $LaCl_3(Ce)$, lanthanum chloride doped with Cerium, as well as a Cerium-doped lanthanum bromide, $LaBr_3(Ce)$. Gaseous scintillators can include, but are not limited to, nitrogen and the noble gases helium, argon, krypton, and xenon. Glass scintillators can include, but are not limited to, cerium-activated lithium or boron silicates.

Advantageously, a reflective layer 103 can have higher reflectivity than current reflectors since the material selection is not limited to those capable of meeting mechanical requirements. The reflective layer can also result in cost savings. The reflective layer 103 can have greater than or equal to 50% reflectivity, greater than or equal to 75% reflectivity, greater than or equal to 90% reflectivity, greater than or equal to 95% reflectivity, or greater than or equal to 98% reflectivity. These percent reflectivities can be provided at wavelengths of from 300 and 800 nm, or from 400 and 700 nm, or from 500 and 600 nm. The reflective layer can be an adhesive backed dielectric reflector, having greater than or equal to 98% reflectivity of wavelengths of from 400 and 700 nm, such as VM2000, which is currently available from 3M Corporation.

The reflective layer 103 can be affixed or secured to the light guide 104 on a surface closest to the sensor/bond interface. The reflective layer 103 can be affixed or secured to the light guide 104 by a variety of methods. The reflective layer 103 can be mechanically fastened to the light guide 104, for example (but not limitation), but not limited, by screws, or bolts. The reflective layer 103 can be adhered to the light guide 104, for example (but not limitation), with an adhesive material. The adhesive material can be applied to the reflective layer 103 or to the light guide 104. The adhesive material can be a pressure sensitive adhesive material. The reflective layer can include one or metals, for example (but not limitation), silver, gold, aluminum, and combinations thereof.

The reflective layer 103 can also be applied as a coating to the light guide 104. For example (but not limitation), the reflective layer 103 can be painted onto the light guide 104. The reflective layer 103 can be sprayed onto the light guide 104. The light guide 104 can also be dipped into a material that will dry to form the reflective layer. When applied as a coating, the reflective layer can include diffracting particles. Diffracting particles are particles that diffract high-energy radiation. The diffracting particles can include for example (but not limitation), titanium dioxide.

The light guide 104 can be rigid. The light guide can comprise a rigid structural material. The light guide can comprise a variety of materials. The materials can be conducive to cooling and/or conducive to mechanical support. For example (but not limitation), the light guide 104 can comprise a polymer, a metal, and/or a ceramic.

The one or more windows 105, for example (but not limitation), can be an array of m×n windows. The one or more windows 105 can provide a pathway for light and/or radiation to pass through optical mask 101. The one or more windows can be in the form of a gap or hole extending through the reflective layer 103 and/or through the light guide 104. The one or more windows 105 can take any desirable geometric shape. The one or more windows 105 can be shaped to correspond with the shape of one or more of the optical sensors.

Figure 2:
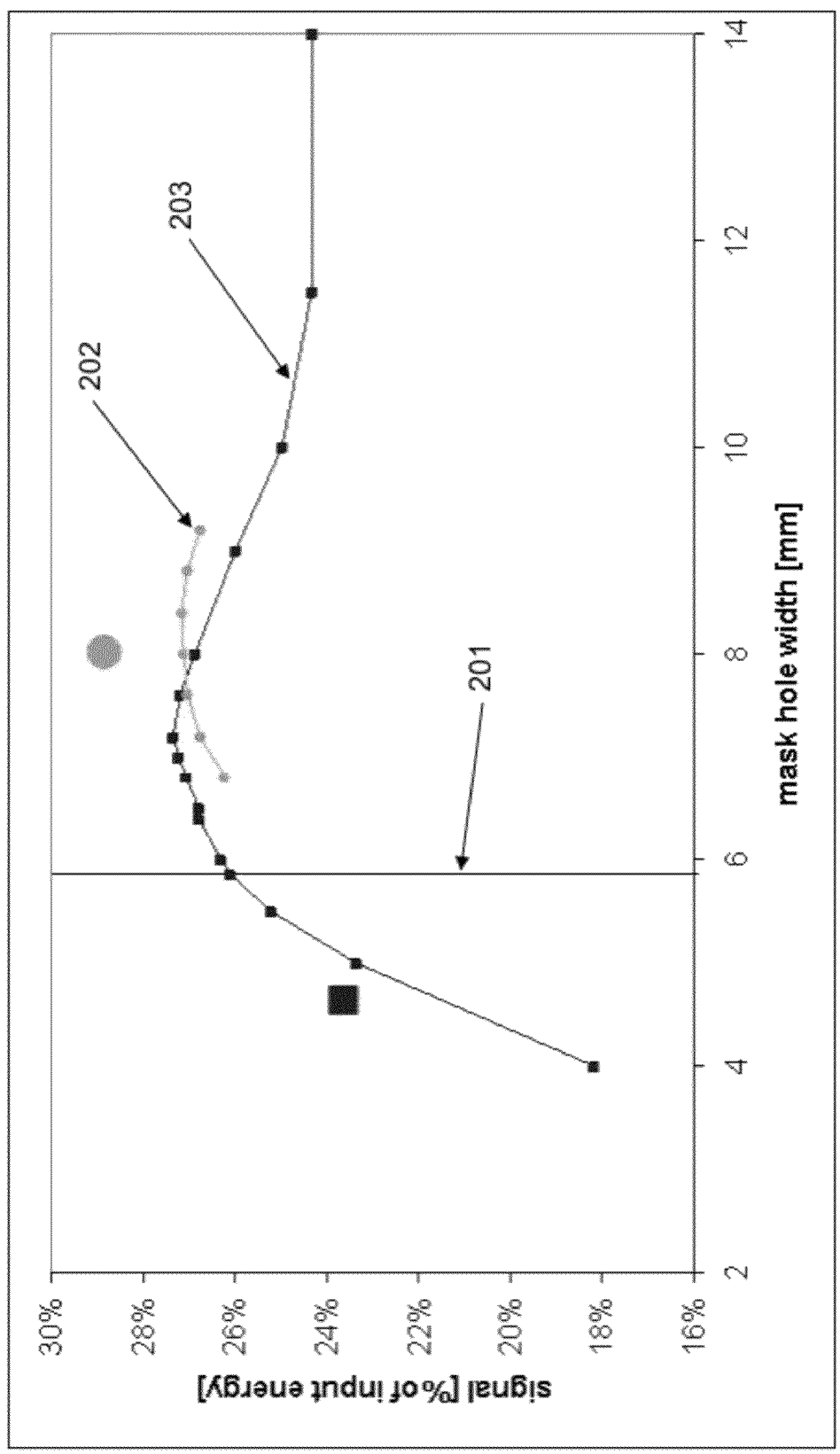
FIG. 2 depicts a graph representing results from simulations to optimize the shape and size of the optical mask windows.

Referring to FIG. 2, the one or more windows 105 can be optimized, minimizing or negating the "dead" area of the optical sensor. As shown in FIG. 2, the optimization process takes into account the size of the active area of the sensor, the distance the scintilator array is placed from the sensors, as well as optical effects such as diffraction. In this example, a rectangular window and a circular window were compared using a simulation tool developed especially for this purpose. Whether one is designing with a standard PMT or a silicon-based sensor, such as an avalanche photodiode (APD), there is an inherent dead region within the sensor that does not actively contribute to the detection of impinging photons. In some cases, photons are absorbed by this inactive region, decreasing the overall sensor performance. Also, the described masking method will allow for different window shaping, which may aid with sampling.

This graph shown in FIG. 2 depicts results from simulations to optimize the shape and size of the optical mask windows. Vertical line 201 represents an initial estimate that the windows should have been 5.6×5.6 mm, i.e., the size of the active sensor area. The sensor employed was an APD (avalanche photo diode), consisting of a ceramic package and an activated piece of silicon. Only silicon can sense light and the silicon's dimensions were 5.6×5.6 mm. It seemed that a 1:1 ratio between the window and active area of the silicon would be a good guess. It was unexpectedly discovered, however, that 7.2×7.2 mm rectangular windows and 8.4 mm diameter circular windows worked best with 27.34% and 27.14% of the light collected, respectively. Connected data points 202 represent the results obtained for circular windows. Connected data points 203 represent the results obtained for rectangular windows. These results were obtained for a mask made with an adhesive backed dielectric reflector, having greater than or equal to 98% reflectivity of wavelengths of from 400 and 700 nm, such as VM2000, which is currently available from 3M Corporation. The optical mask can be circular or square. In certain circumstances, however, the square window is preferable due to spatial constraints, namely available room on the optical mask.

The above disclosure provides examples and aspects relating to various embodiments within the scope of claims, appended hereto or later added in accordance with applicable law. However, these examples are not limiting as to how any disclosed aspect may be implemented, as those of ordinary skill can apply these disclosures to particular situations in a variety of ways.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

We claim:

1. An optical mask for a scintillator array in a medical imaging device, the optical mask comprising;
   a light guide layer having a first surface and a second surface; and
   a reflective layer affixed to the first surface of the light guide layer,
   wherein the second surface of the light guide layer is positioned on the scintillator array, and the reflective layer is affixed to the first surface of the light guide layer,
   wherein the first surface of the light guide layer is opposite to the scintillator array, and
   a window that provides a pathway for light or radiation to pass through the reflective layer, the light guide layer and the scintillator array in sequence.

2. The optical mask according to claim 1, wherein the light guide layer comprises a rigid structural material.

3. The optical mask according to claim 1, wherein the reflective layer has greater than or equal to 90% reflectivity for wavelengths between 300 and 800 nm.

4. The optical mask according to claim 3, wherein the reflective layer has greater than or equal to 95% reflectivity.

5. The optical mask according to claim 1, wherein the reflective layer has greater than or equal to 98% reflectivity between 400 and 700 nm.

6. The optical mask according to claim 1, wherein the reflective layer comprises diffracting particles.

7. The optical mask according to claim 1, wherein the optical mask comprises one or more windows extending through the reflective layer and/or the light guide layer.

8. The optical mask according to claim 7, wherein the optical mask is disposed around an avalanche photodiode (APD) having an active area of 5.6×5.6 mm and at least one of the one or more windows is rectangular in shape and has dimensions of 7.2×7.2 mm.

9. The optical mask according to claim 7, wherein the optical mask is disposed around an avalanche photodiode (APD) having an active area of 5.6×5.6 mm and at least one of the one or more windows is circular in shape and has a diameter of 8.4 mm diameter.

10. An optical mask for a scintillator array in a medical imaging device, wherein the optical mask is produced by affixing a reflective layer to a first surface of a light guide layer, and
    wherein a second surface of the light guide layer is positioned on the scintillator array, and the reflective layer is affixed to the first surface of the light guide layer,
    wherein the first surface of the light guide layer is opposite to the scintillator array, and
    a window that provides a pathway for light or radiation to pass through the reflective layer, the light guide layer and the scintillator array in sequence.

11. The optical mask according to claim 10, wherein the light guide layer comprises a rigid structural material.

12. The optical mask according to claim 10, wherein the reflective layer is painted onto the light guide.

13. The optical mask according to claim 10, wherein the reflective layer is affixed to the light guide using a pressure sensitive adhesive.

14. A method for producing an optical mask for a scintillator array in a medical imaging device, the method comprising affixing a reflective layer to a first surface of a light guide layer,
    wherein a second surface of the light guide layer is positioned on the scintillator array, and the reflective layer is affixed to the first surface of the light guide layer,
    wherein the first surface of the light guide layer is opposite to the scintillator array, and
    passing light or radiation, via a window, through the reflective layer, the light guide layer and the scintillator array in sequence.

15. The method according to claim 14, wherein the light guide layer comprises a rigid structural material.

16. The method according to claim 14, wherein the reflective layer is painted onto the light guide.

17. The method according to claim 14, wherein the reflective layer is affixed to the light guide using a pressure sensitive adhesive.

* * * * *